(12) United States Patent
Minagawa et al.

(10) Patent No.: US 7,493,927 B2
(45) Date of Patent: Feb. 24, 2009

(54) RUBBER COMPOSITION

(75) Inventors: Yasuhisa Minagawa, Kobe (JP); Noriko Yagi, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 408 days.

(21) Appl. No.: 11/042,109

(22) Filed: Jan. 26, 2005

(65) Prior Publication Data

US 2005/0187332 A1 Aug. 25, 2005

(30) Foreign Application Priority Data

Feb. 19, 2004 (JP) .............................. 2004-042661

(51) Int. Cl.
*B60C 1/00* (2006.01)
*C08K 3/38* (2006.01)

(52) U.S. Cl. .................... 152/209.1; 524/404; 524/405; 524/571

(58) Field of Classification Search ................. 524/405, 524/424
See application file for complete search history.

(56) References Cited

U.S. PATENT DOCUMENTS 4,569,382 A * 2/1986 Maxey et al. ............... 152/548

| | | | |
|---|---|---|---|
| 5,872,176 A * | 2/1999 | Hergenrother et al. | 524/494 |
| 6,107,384 A * | 8/2000 | Hatakeyama et al. | 524/405 |
| 2007/0015861 A1 * | 1/2007 | Minagawa et al. | 524/492 |

FOREIGN PATENT DOCUMENTS

| EP | 0 890 602 A1 | 1/1999 |
|---|---|---|
| JP | 9-3206 A | 1/1997 |
| JP | 11-255964 A | 9/1999 |
| JP | 11-269313 A | 10/1999 |
| JP | 2000-219779 A | 8/2000 |
| JP | 2001-233997 A | 8/2001 |
| JP | 2001-247718 A | 9/2001 |
| JP | 2002-13084 A | 1/2002 |

* cited by examiner

*Primary Examiner*—Vasu Jagannathan
*Assistant Examiner*—Vickey Ronesi
(74) *Attorney, Agent, or Firm*—Birch, Stewart, Kolasch & Birch, LLP

(57) ABSTRACT

The present invention provides a rubber composition, in which reaction efficiency of the silane coupling agent in kneading is improved, generation of bubbles is suppressed, abrasion resistance is improved and rolling resistance is reduced. Specifically, the rubber composition comprises silica and 3 to 15 parts by weight of a silane coupling agent and 1.5 to 15 parts by weight of a potassium salt based on 100 parts by weight of the silica.

2 Claims, No Drawings

RUBBER COMPOSITION

BACKGROUND OF THE INVENTION

The present invention relates to a rubber composition, in which reaction efficiency of the silane coupling agent and various properties are improved.

In recent years, both fuel efficiency and improved wet grip performance are strongly desired in a tire and in order to satisfy such demands, silica is compounded in the tread. However, sufficient reinforcing properties cannot be obtained with only silica and a silane coupling agent is used together with silica. Usually, a silane coupling agent having an alkoxyl group is used for tires. However, reaction of the silane coupling agent cannot sufficiently be completed in the rubber kneading step and in order to obtain sufficient reinforcing properties, more of the silane coupling agent than necessary must be compounded. Furthermore, the silane coupling agent that could not finish reacting during kneading (hereinafter referred to as unreacted silane coupling agent) reacts in the extrusion step to generate alcohol (such as ethanol) and there is the problem that bubbles arise in the extruded unvlucanized tread.

As a method to solve such problems, JP-A-2001-247718 discloses compounding various sodium salts in a rubber composition. According to this method, reaction efficiency of the silane coupling agent is improved, but the improvement is insufficient. Thus, generation of bubbles in the extruded tread cannot be suppressed completely.

SUMMARY OF THE INVENTION

The present invention aims to provide a rubber composition, in which reaction efficiency of the silane coupling agent in kneading is improved, generation of bubbles is suppressed, abrasion resistance is improved and rolling resistance is reduced.

The present invention relates to a rubber composition comprising silica and 3 to 15 parts by weight of a silane coupling agent and 1.5 to 15 parts by weight of a potassium salt based on 100 parts by weight of the silica.

The potassium salt is preferably an inorganic potassium salt.

Also, the potassium salt is preferably at least one member selected from the group consisting of potassium carbonate, potassium hydrogencarbonate and potassium borate.

DETAILED DESCRIPTION

The rubber composition of the present invention comprises a rubber component, silica, a silane coupling agent and a potassium salt.

Examples of the rubber component are natural rubber (NR), styrene-butadiene rubber (SBR), butadiene rubber (BR), isoprene rubber (IR), ethylene-propylene-diene rubber (EPDM), chloroprene rubber (CR), acrylonitrile-butadiene rubber (NBR) and butyl rubber (IIR). These rubbers may be used alone or two or more kinds may be used together. Of these, diene rubber is preferably used as the rubber component and more preferably, SBR is used. Among SBR, SBR containing oil is particularly preferably used as the rubber component, from the viewpoint of improving wet grip performance and abrasion resistance.

The silica can be silica prepared by a wet method or a dry method and is not particularly limited.

The content of silica is preferably 10 to 120 parts by weight based on 100 parts by weight of the rubber component. When the content of silica is less than 10 parts by weight, the effect of improving wet grip performance and fuel efficiency obtained by adding silica is hardly obtained. When the content is more than 120 parts by weight, the obtained rubber composition becomes too hard that sufficient wet grip performance may not be obtained.

The silane coupling agent can be any silane coupling agent that is conventionally used together with silica. Specific examples are sulfide-types such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl) disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N, N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazolyltetrasulfide, 3-triethoxysilylpropylmethacrylatemonosulfide and 3-trimethoxysilylpropylmethacrylatemonosulfide; mercapto-types such as 3-mercaptopropyltrimethoxysilane, 3-mercaptopropyltriethoxysilane, 2-mercaptoethyltrimethoxysilane and 2-mercaptoethyltriethoxysilane; vinyl-types such as vinyl triethoxysilane and vinyl trimethoxysilane; amino-types such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane; glycidoxy-types such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro-types such as 3-nitropropyltrimethoxysilane and 3-nitropropyltriethoxysilane; and chloro-types such as 3-chloropropyltrimethoxysilane, 3-chloropropyltriethoxysilane, 2-chloroethyltrimethoxysilane and 2-chloroethyltriethoxysilane. In view of achieving both the effects of adding the coupling agent and low cost, bis(3-triethoxysilylpropyl)tetrasulfide, bis(3-triethoxysilylpropyl) disulfide and 3-mercaptopropyltrimethoxysilane are suitably used. These coupling agents may be used alone or two or more kinds may be used together.

The content of the silane coupling agent is 3 to 15 parts by weight based on 100 parts by weight of silica. When the content of the silane coupling agent is less than 3 parts by weight, the coupling effect is insufficient, wet grip performance cannot sufficiently be obtained and abrasion resistance decreases. When the content is more than 15 parts by weight, the obtained rubber composition becomes hard and wet grip performance decreases.

Examples of the potassium salt used in the present invention are inorganic potassium salt and organic potassium salt. Examples of the inorganic potassium salt are potassium carbonate, potassium hydrogencarbonate, potassium sulfate, potassium hydrogenphosphate, potassium dihydrogenphosphate and potassium oxalate. Examples of the organic potassium salt are potassium acetate, potassium gluconate, potassium citrate, potassium fumarate, potassium laurate, potassium palmitate, potassium stearate, potassium oleate and potassium linoleate.

From the viewpoint of further improving reaction efficiency of the silane coupling agent, the potassium salt used in the present invention is preferably an inorganic salt, more preferably a potassium salt selected from the group consisting of potassium carbonate, potassium hydrogencarbonate and potassium borate.

The content of the potassium salt is 1.5 to 15 parts by weight based on 100 parts by weight of silica. When the content is less than 1.5 parts by weight, reaction efficiency of the silane coupling agent is not sufficiently improved. Also, reaction efficiency of the silane coupling agent cannot be improved further, even if the content of the potassium salt is more than 15 parts by weight.

Besides the rubber component, silica, the silane coupling agent and potassium salt, compounding agents that are usually used in the rubber industry, such as a reinforcing agent including carbon black, a softening agent including aromatic oil, zinc oxide, stearic acid, an antioxidant, a vulcanizing agent and a vulcanization accelerator can be compounded to the rubber composition of the present invention when necessary.

The rubber composition of the present invention is extrusion molded into the components of a tire (such as a tire tread) and laminated by the usual method on a tire molding machine to form an unvulcanized tire. The unvulcanized tire is heated and pressurized in a vulcanizer to obtain a tire.

Hereinafter, the present invention is explained in detail by means of Examples, but the present invention is not limited thereto.

EXAMPLES 1 TO 10 AND COMPARATIVE EXAMPLES 1 TO 4

The various chemicals used in Examples and Comparative Examples are described below.
Diene rubber composition: Oil extended SBR 1712 (contains 37.5 parts by weight of oil based on 100 parts by weight of the rubber component) available from JSR Corporation
Carbon black: DIABLACK I available from Mitsubishi Chemical Corporation
Silica: Ultrasil VN3 available from Degussa Co.
Silane coupling agent: Si266 (bis(3-triethoxysilylpropyl)disulfide) available from Degussa Co.
Aromatic oil: X140 available from Japan Energy Corporation
Stearic acid: Tsubaki available from NOF Corporation
Zinc oxide: Zinc oxide available from Mitsui Mining and Smelting Co., Ltd.
Antioxidant: NOCRAC 6C available from Ouchi Shinko Chemical Industrial Co., Ltd.
Vulcanization Accelerator TBBS: Nocceler NS available from Ouchi Shinko Chemical Industrial Co., Ltd.
Vulcanization Accelerator DPG: Nocceler D available from Ouchi Shinko Chemical Industrial Co., Ltd.
Sodium hydrogencarbonate: available from Wako Pure Chemical Industries, Ltd.
Potassium hydrogencarbonate: available from Wako Pure Chemical Industries, Ltd.
Potassium carbonate: available from Wako Pure Chemical Industries, Ltd.
Potassium tetraborate tetrahydrate: available from Wako Pure Chemical Industries, Ltd.
Sodium tetraborate decahydrate: available from Wako Pure Chemical Industries, Ltd.

Preparation of the rubber composition is described below.

First, 137.5 parts by weight of diene synthetic rubber (rubber component 100 parts by weight), 55 parts by weight of silica, 20 parts by weight of carbon black, 10 parts by weight of aromatic oil, and the silane coupling agent, various potassium salts and sodium salts in the amounts shown in Tables 1 and 2 were kneaded using a 1.7 L banbury. The kneaded article was discharged when the kneading temperature was 150° C.

Subsequently, 2 parts by weight of stearic acid, 3 parts by weight of zinc oxide and 1 part by weight of the antioxidant were kneaded with the above kneaded article using a 1.7 L banbury and the kneaded article was discharged when the kneading temperature was 130° C. Furthermore, 1.5 parts by weight of sulfur, 1 part by weight of vulcanization accelerator TBBS and 0.5 part by weight of vulcanization accelerator DPG were kneaded using a roll to obtain each unvulcanized rubber sheet.

The obtained rubber composition was press vulcanized at 170° C. for 20 minutes to obtain a vulcanized article. Each of the following tests of properties described below were conducted for each obtained vulcanized article.

Test Methods (Abrasion Resistance Index)

The volume loss of each vulcanized article was measured under conditions of slip ratio of 40% and testing time of 3 minutes using a Lambourn abrasion tester. The volume loss of each vulcanized article was represented as an index by the following equations. The larger the index is the better the abrasion resistance.

(Abrasion index of Ex. 1 to 6 and Com. Ex. 1 and 2)=(volume loss of Com. Ex. 1)/(volume loss of each Ex.)×100

(Abrasion index of Ex. 7 to 10 and Com. Ex. 3 and 4)=(volume loss of Com. Ex. 3)/(volume loss of each Ex.)×100

(Rolling Resistance Index)

The tan δ of each vulcanized article was measured under conditions of temperature of 70° C., initial strain of 10% and dynamic strain of 2% using a viscoelasticity spectrometer VES (made by Iwamoto Corporation). The tan δ of each vulcanized article was represented as an index by the following equations. The larger the index is the better the rolling resistance.

(Rolling resistance index of Ex. 1 to 6 and Com. Ex. 1 and 2)=(tan δ of Com. Ex. 1)/(tan δ of each Ex.)×100

(Rolling resistance index of Ex. 7 to 10 and Com. Ex. 3 and 4)=(tan δ of Com. Ex. 3)/(tan δ of each Ex.)×100

(Weight Loss by Heating)

The unvulcanized rubber sheet (2 mm) after rubber kneading was placed in a 130° C. oven for 2 hours. The weight before and after placing in the oven was measured and the weight loss by heating was calculated from the following equation. A smaller value signifies that the amount of generated alcohol is small and that a sufficient amount of the silane coupling agent is reacted during kneading. That is, when a sufficient amount of the silane coupling agent is reacted during kneading, the amount of the unreacted silane coupling agent is small and the weight loss by heating decreases, as only a small amount of alcohol is generated in the oven.

(Weight loss by heating)=(weight of each kneaded article after placing in oven)/(weight of each kneaded article before placing in oven)×100

(Generation of Bubbles)

The rubber sheet after weight loss by heating was cut and the cross section thereof was observed for bubbles and the number and state thereof.

The measurement results of when potassium carbonate and potassium hydrogencarbonate were used as the potassium salt are shown in Table 1.

TABLE 1

|  | Ex. | | | | | | Com. Ex. | |
|---|---|---|---|---|---|---|---|---|
|  | 1 | 2 | 3 | 4 | 5 | 6 | 1 | 2 |
| Composition (parts by weight) | | | | | | | | |
| Silane coupling agent | 4.4 | 4.4 | 2.2 | 6.6 | 4.4 | 4.4 | 4.4 | 4.4 |
| Sodium hydrogencarbonate | — | — | — | — | — | — | — | 2.2 |
| Potassium hydrogencarbonate | 2.2 | — | — | — | — | — | — | — |
| Potassium carbonate | — | 2.2 | 2.2 | 2.2 | 1.1 | 4.4 | — | — |
| Evaluation results | | | | | | | | |
| Abrasion resistance index | 109 | 108 | 103 | 112 | 106 | 115 | 100 | 105 |
| Rolling resistance index | 106 | 109 | 105 | 110 | 106 | 113 | 100 | 103 |
| Weight loss by heating (%) | 0.5 | 0.3 | 0.2 | 0.45 | 0.45 | 0.25 | 0.8 | 0.6 |
| Bubbles | None | None | None | Very few | Very few | None | Many | Very few |

From Example 1 and Comparative Example 2, it can be seen that by compounding potassium salt instead of sodium salt in the rubber composition, bubbles are not generated and properties improve significantly. Also, from Example 2, by compounding potassium carbonate, the weight loss by heating is reduced significantly and properties are improved further. Example 3 shows that by compounding potassium carbonate, the amount of the silane coupling agent can be reduced.

The measurement results of when potassium tetraborate was used as the potassium salt are shown in Table 2.

TABLE 2

|  | Ex. | | | | Com. Ex. | |
|---|---|---|---|---|---|---|
|  | 7 | 8 | 9 | 10 | 3 | 4 |
| Composition (parts by weight) | | | | | | |
| Silane coupling agent | 4.4 | 2.2 | 6.6 | 4.4 | 4.4 | 4.4 |
| Potassium tetraborate tetrahydrate | 2.2 | 2.2 | 2.2 | 4.4 | — | — |
| Sodium tetraborate decahydrate | — | — | — | — | — | 2.2 |
| Evaluation results | | | | | | |
| Abrasion resistance index | 118 | 105 | 119 | 121 | 100 | 108 |
| Rolling resistance index | 110 | 105 | 114 | 113 | 100 | 104 |
| Weight loss by heating (%) | 0.3 | 0.2 | 0.35 | 0.25 | 0.8 | 0.4 |
| Bubbles | None | None | Very few | None | Many | Very few |

From Example 7 and Comparative Example 4, it can be seen that by compounding potassium tetraborate, the weight loss by heating is reduced significantly and bubbles are not generated. Also, the weight loss by heating is less than when sodium tetraborate is compounded. Furthermore, in view of properties, abrasion resistance and rolling resistance are improved significantly compared to Comparative Examples 3 and 4. In this way, it was found that by compounding potassium tetraborate instead of sodium tetraborate, performance is improved significantly and also, as shown in Example 8, the amount of the silane coupling agent can be reduced.

According to the present invention, by compounding silica, a specific amount of a silane coupling agent and a potassium salt having high ionization tendency to a rubber composition, reaction efficiency of the silane coupling agent can be improved and generation of bubbles can be suppressed. Also, abrasion resistance can be improved and rolling resistance can be reduced.

What is claimed is:

1. A tire having a tread, wherein said tread is formed from a rubber composition comprising silica and 3 to 15 parts by weight of a silane coupling agent and 1.5 to 15 parts by weight of a potassium tetraborate tetrahydrate based on 100 parts by weight of said silica.

2. The tire tread according to claim 1, further comprising a rubber component wherein the silica is present in an amount of 10 to 120 parts by weight based on 100 parts by weight of the rubber component.

* * * * *